UNITED STATES PATENT OFFICE.

WILLIAM H. RIDGWAY, OF SHARPTOWN, NEW JERSEY.

IMPROVEMENT IN MEDICAL COMPOUNDS.

Specification forming part of Letters Patent No. 214,453, dated April 15, 1879; application filed March 14, 1879.

*To all whom it may concern:*

Be it known that I, WILLIAM H. RIDGWAY, of Sharptown, in the county of Salem and State of New Jersey, have invented certain new and useful Improvements in Medical Compounds; and I do hereby declare that the following is a full, clear, and exact description thereof, which will enable others skilled in the art to which it appertains to make and use the same.

This invention has relation to improvements in medical compounds for the relief and cure of dyspepsia, fever and ague, and liver complaints; and it consists of the ingredients and manner of compounding the same, hereinafter more fully set forth, and particularly pointed out in the claim.

For compounding the medicine, I take of sarsaparilla-root, dandelion-root, mandrake-root, and pulverized Peruvian bark, of each, two (2) ounces; dried elder-flowers, one (1) ounce, the whole to be put in six (6) quarts of water, in which has been dissolved two (2) pounds of white sugar. The water is then boiled down until it measures three (3) quarts. I then strain and add one pint of best apple whisky.

The dose for an adult is, ordinarily, one (1) teaspoonful, morning and evening.

I am aware that sarsaparilla administered with general tonics has been used.

Having thus described my compound and the manner of compounding and administering the same, what I claim as new and useful, and desire to secure by Letters Patent of the United States, is—

A medical compound consisting of sarsaparilla, dandelion, and mandrake roots, Peruvian bark, elder-flowers, sugar, and apple whisky, compounded in the proportions substantially as herein shown and described.

In testimony that I claim the foregoing as my own I affix my signature in presence of two witnesses.

WM. H. RIDGWAY, A. M.

Witnesses:
OLIVER H. WIGGINS,
LEWIS H. VANHIST.